F. TRINKS.
CALCULATING MACHINE.
APPLICATION FILED JULY 5, 1911.

1,022,280.

Patented Apr. 2, 1912.
4 SHEETS—SHEET 1.

Witnesses

Inventor
Franz Trinks
by
Atty.

F. TRINKS.
CALCULATING MACHINE.
APPLICATION FILED JULY 5, 1911.

1,022,280.

Patented Apr. 2, 1912.

4 SHEETS—SHEET 2.

Witnesses:

Inventor
Franz Trinks
by

F. TRINKS.
CALCULATING MACHINE.
APPLICATION FILED JULY 5, 1911.

1,022,280.

Patented Apr. 2, 1912.
4 SHEETS—SHEET 3.

F. TRINKS.
CALCULATING MACHINE.
APPLICATION FILED JULY 5, 1911.

1,022,280.

Patented Apr. 2, 1912.

4 SHEETS—SHEET 4.

Witnesses:

Inventor
Franz Trinks
by
Atty

Figure 1:
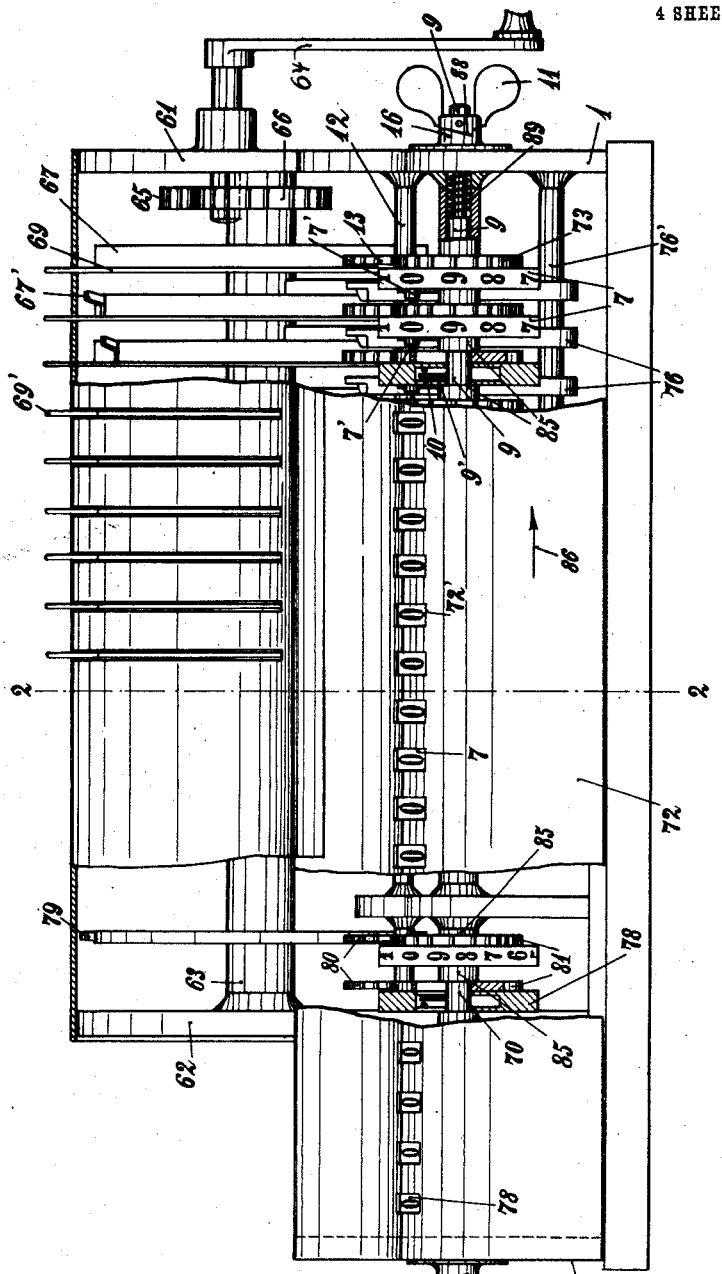
Figure 2:
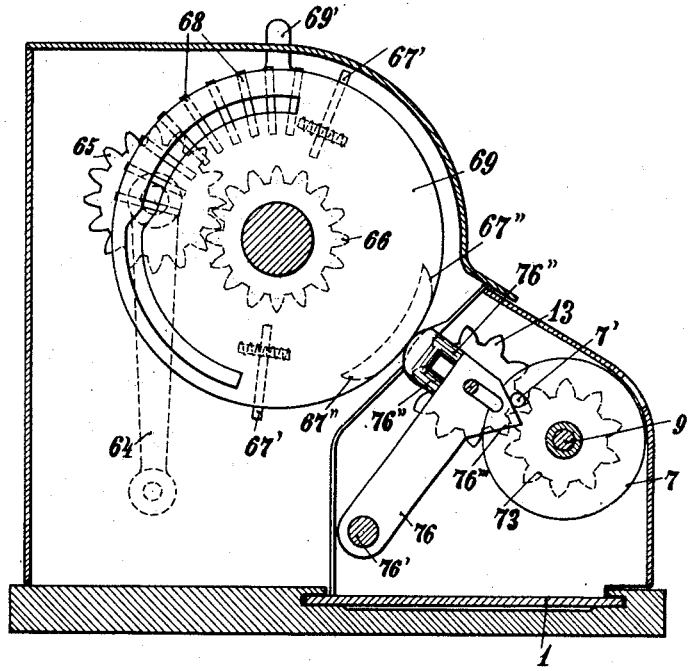

Figs. 1 and 2. A rotary shaft 63 is mounted in a pair of side walls 61 and 62 of the casing of the machine. The said shaft is operatively connected with the machine crank 64 through spur gears 65 and 66, and it carries a plurality of setting disks 67 each of which is provided with nine radial slots. Within the latter radially shiftable teeth 68 are located which with lateral noses engage in a cam slot formed in a cam disk 69 loosely mounted on the shaft 63. By rotating the said cam disk on the shaft 63 by means of a handle 69' any desired number of the teeth 68 can be shifted into a position beyond the periphery of the setting disks. The number of the teeth 68 shifted beyond the periphery of the setting disks represents the value to be introduced in the calculation in each column of the registering mechanism. In front of the said setting disks, the whole of which may be termed the setting mechanism, numeral wheels 67 are loosely mounted on a shaft 9 disposed parallel to the shaft 63. Each of the said numeral wheels is provided at its circumference with the numerical characters from "1" to "9" and the "0" sign, and one of the said characters of each column of numeral wheels is at a time displayed through a peep hole 72' made in a cover 72 which is common to all the numeral wheels. Each of the numeral wheels 7 has a spur gear 73 secured to its side which is provided with ten teeth, and the latter are in mesh with the teeth of a transmission wheel 13 which is loosely mounted on a shaft 12 disposed parallel to the shaft 9 of the numeral wheels. The said transmission wheels 13 which as shown are mounted on the same axis 12 are located in the plane of the radially shiftable teeth 68 of the setting disks 67, and when rotating the said disks 67 by means of the machine crank 64 the teeth 68 mesh with the teeth of the transmission wheels 13 so as to advance the same. Thereby also the numeral wheels are advanced a distance which corresponds to the number of teeth 68 projected into their operative positions beyond the periphery of the setting disks 67. In order to transmit a certain number to the numeral wheels 7 the operator sets the said number on the setting disks 67, 68, whereupon he rotates the crank 64. Carrying means are provided between consecutive numeral wheels which shift a numeral wheel forward or backward the distance corresponding to

UNITED STATES PATENT OFFICE.

FRANZ TRINKS, OF BRUNSWICK, GERMANY.

CALCULATING-MACHINE.

1,022,280.     Specification of Letters Patent.     Patented Apr. 2, 1912.

Application filed July 5, 1911. Serial No. 636,940.

*To all whom it may concern:*

Be it known that I, FRANZ TRINKS, engineer, subject of the Duchy of Brunswick, Empire of Germany, residing at 71 Kastanienallee, Brunswick, Germany, have invented certain new and useful Improvements in Calculating-Machines, of which the following is a specification.

My invention relates to improvements in calculating machines and more particularly to that class of calculating machines, in which the values of the calculations are set on setting disks having a variable number of teeth adapted to transmit the said values to a registering mechanism which is mounted on a slidable carriage adapted to be shifted laterally along the setting mechanism, so that its registering elements or numeral wheels can be brought into coöperation with any of the setting disks of the setting mechanism. And the object of the improvements is to provide a calculating machine of this class in which the operator can either simultaneously reset all the registering elements or numeral wheels, or only a part of the same, as the calculations to be performed on the machine may require.

With this and other objects in view the invention consists of the combinations of elements described hereinafter and particularly pointed out in the appended claims.

For the purpose of explaining the invention several examples embodying the same have been shown in the accompanying drawings in which the same letters of reference have been used in all the views to indicate corresponding parts.

Figure 3:
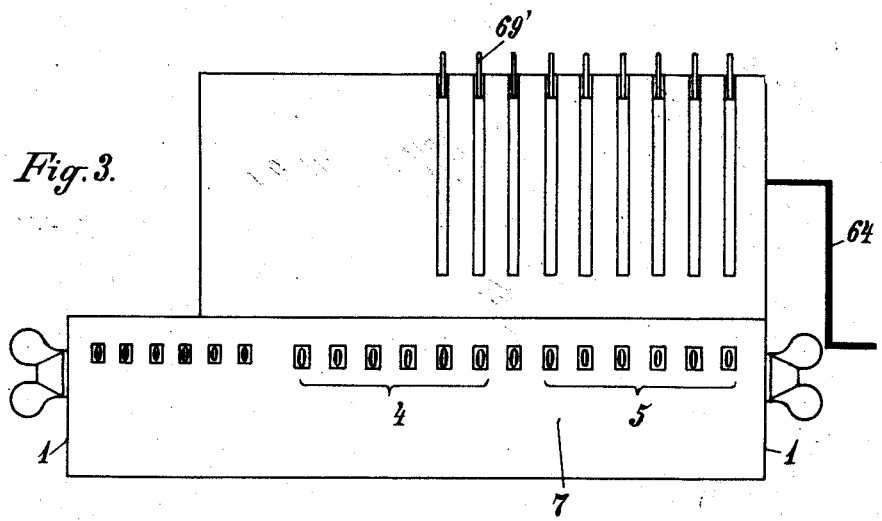
Figure 4:
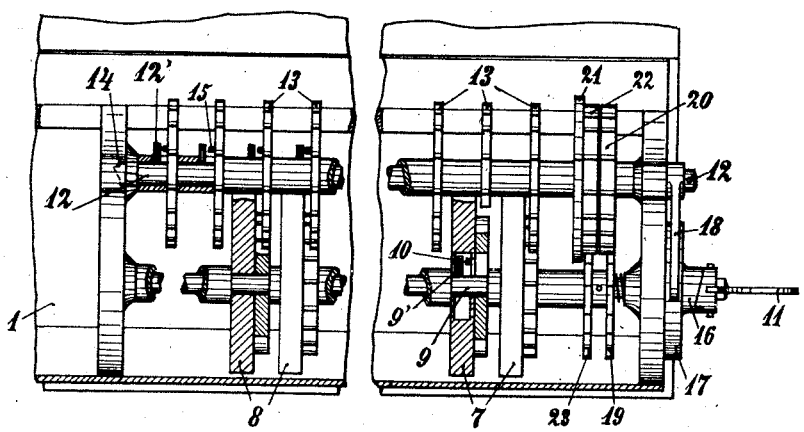
Figure 5:
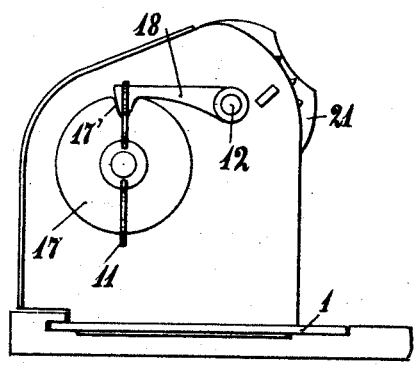
Figure 6:
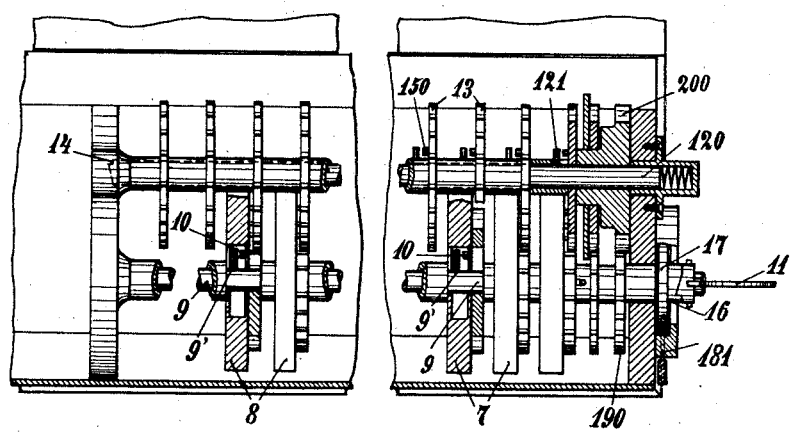
Figure 7:
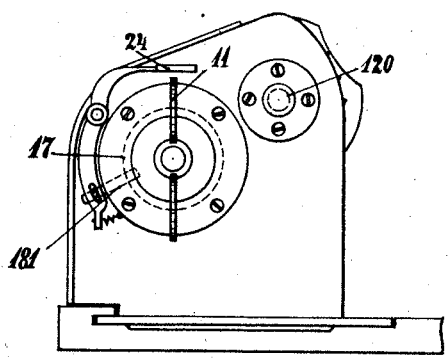

In said drawings—Figure 1, is a front view of the machine with the cover of the machine casing partly removed, Fig. 2, is a vertical cross-section of the machine taken on the line 2—2 of Fig. 1, Fig. 3, is a diagrammatical view of the machine shown in Fig. 1 and illustrating a special operation of the machine, Fig. 4, is a plan view of the main registering mechanism and its carriage with the cover removed and partly in section, illustrating a modification of the invention, Fig. 5, is a side view of Fig. 4, Fig. 6, is a plan view similar to that shown in Fig. 4 and illustrating another modification, and Fig. 7, is a side view of Fig. 6.

Before explaining my invention I shall describe a calculating machine of that class in which the improvements are preferably embodied. Such a machine is illustrated in one value, if the numeral wheel of the next lower order passes from its "9" position into its "0" position, or vice versa. In the example illustrated rocking levers 76 having the form of hammers are used for this purpose, which levers are loosely mounted on a shaft 76' disposed parallel to the axis of the registering mechanism, and which extend with their free upper ends to points adjacent to the gear wheels 13. Each of the numeral wheels 7 is provided with a pin 7' which strikes the head 76''' of the hammer 76 so as to rock the latter, when the numeral wheel passes from its "9" position into its "0" position, or vice versa. Thereby a cam face 76'' of the rocking lever 76 is thrown into the path of a laterally shiftable tooth 67' of the coöperating setting disk 67. Upon rotation of the setting disk 67 the cam face 76'' shifts the tooth 67' laterally and into mesh with the teeth of the transmission wheel 13 coöperating with the numeral wheel 7 of the next higher order. Thereby the said numeral wheel 7 is advanced the distance of one value. As, for the purpose of performing additions or subtractions, or multiplications or divisions, the crank can be turned either to the right or to the left, two teeth 67' and cam faces 76'' are provided, only one of which is operative when turning the crank in one direction. At the end of the carrying operation cam faces 67'' rock the levers 76 into their normal positions shown in Fig. 2. At the left of the registering mechanism, and preferably coaxially therewith, a second registering mechanism 78 is provided, the numeral wheels of which are used for counting the revolutions of the machine crank. The said revolutions counting mechanism is actuated from the shaft 63 which at its left end carries a single tooth wheel 79 adapted upon each revolution of the shaft 63 to advance a spur gear 80 the distance of two consecutive teeth. In the position of the registering mechanisms 7, 78 shown in Figs. 1 and 2, the said gear wheel 80 is in mesh with a gearing 81 of the numeral wheel 78 of the lowest order which is located at the right hand end of the set of numeral wheels 78. Therefore the said numeral wheel is advanced a distance corresponding to one value, if the crank of the machine performs a revolution. Each of the numeral wheels is connected with a gearing 81, and all the gear wheels 80 meshing with the gearings 81 are loosely mounted on a shaft 84 disposed parallel to the shaft 70 of the registering mechanism 78. Carrying devices are not required for the revolutions counting mechanism. Both registering mechanisms 7 and 78 are provided with resetting mechanisms adapted to set the numeral wheels into their zero positions. In the example shown the resetting mechanism is constructed as follows: At its outer end the shaft 9 carries a nut 11, and within each of the numeral wheels 7 it is provided with a radial pin 9'. Each of the numeral wheels is provided with an abutment 10. In the normal position of the shaft 9 and the abutments 10 the latter are located out of the path of the pins 9'. Upon rotation of the shaft 9 by means of the nut 11 the shaft 9 is shifted laterally against the action of a spring 89 by means of a cam face 88, so that the pins 9' are shifted into the path of the abutments 10. Therefore, if the shaft 9 is further rotated, the pins 9' engage the abutments 10 so as to move the numeral wheels into their zero positions. At the end of the resetting operation the shaft 9 is shifted backward again, so that the pins 9' are again out of engagement with the abutments 10. Resetting mechanisms of the same construction are provided on the shaft 70 which carries a nut 90 at its outer end. Short sleeves 85 prevent the axial displacement of the wheels 7 and 78. The registering mechanism 7 and the revolutions counting mechanism 78 are mounted on a carriage 1 adapted to be shifted in a direction parallel to the axis 63. In mechanisms heretofore constructed analogous to the present construction, if it was desired to multiply a certain number, for example 482, by 300, the number 482 was set on the setting mechanism 67, 68, 69, and then transmitted three hundred times to the registering mechanism 7 by turning the crank 64 three hundred times. The registering mechanism would then display the number 144600, this being the result of the multiplication. Obviously this operation required much time, and the time necessary for performing the multiplying operation can be reduced considerably by shifting the registering mechanism laterally in a direction parallel to the axis of the setting mechanism. By the improved mechanism the aforesaid multiplication may be more expeditiously performed as follows: The number 482 is again set on the setting mechanism 67, 68, 69, whereupon the carriage 1 of the registering mechanism is shifted two spaces to the right in the direction of the arrow 86 shown in Fig. 1, so that the setting disk of the lowest order coöperates with the numeral wheel of the third column from the right. In this position of the carriage 1 each revolution of the crank performs a multiplication of the number 482 set on the setting mechanism with 100. Accordingly the revolutions counting mechanism 78 does not indicate the number "1" but the number "100", because in this position of the carriage 1 the single tooth 79 acts through the transmission gear 80 on the spur gear 81 connected with the numeral wheel 78 of the third column. It appears therefore, that for performing the aforesaid calculation only three operations of the crank 64 are required. If, on a machine of this construction which is equipped with a single main registering mechanism 7, a continuous multiplication or addition of the form $a.m+b.n+c.o+$etc. is to be performed, the multiplicand $a$ is set on the setting mechanism 69' shown in a diagrammatical way in Fig. 3, and by rotating the machine crank 64 as many times, as corresponds to the value of the multiplier $m$, it is transferred to the registering mechanism, so that the latter displays the product $a.m$. Now the value $a$ is deleted from the setting mechanism, and the product $a.m$ is set on the setting mechanism in lieu thereof, whereupon the product is deleted from the registering mechanism 7 by rotating the crank in the direction opposite to that in which it was rotated before. Now the product $a.m$ which has been set on the setting mechanism 69' is transmitted to a set of numeral wheels 4 of higher order which are located on the left hand side of the registering mechanism, for which purpose the carriage 1 is shifted to the left and the machine crank is rotated in the proper direction. The set of numeral wheels 4 located at the left of the machine can thus be used for adding the products, because the products of the values are comparatively small. For example for summing up wages, prices, etc., which form the main field of use of the calculation referred to a registering mechanism of ordinary construction which is provided with thirteen numeral wheels will always be sufficient. In such a machine the first six numeral wheels 5 are used for the multiplication and the six numeral wheels 4 which are located at the left of the machine are used for summing up the products, while for the matter of safety the intermediate wheel is not used at all. In order that the said calculation may more conveniently be carried out means have been provided whereby, when resetting the products registered in the main registering mechanism 7 displaying the products, the said products are automatically transmitted to the setting mechanism, so that it is not necessary to set the setting mechanism by hand. However constructions of this class such as are now in use are objectionable in this respect, that the value registered in the left hand numeral wheels 4 is likewise deleted. In my improved calculating machine this objection is removed, and my invention consists in providing resetting means for the registering mechanism whereby a part of the numeral wheels can separately be reset.

I am aware, that in calculating machines which are provided with two independent registering mechanisms resetting means have been provided whereby the registering mechanisms can be reset either simultaneously or separately, and I do not claim such a construction. What I do claim is a calculating machine in which a single registering mechanism is provided in which the groups of numeral wheels can be reset either separately or simultaneously, so that a calculation of the character referred to above can be performed.

In describing now those parts of the machine to which my invention more particularly relates, reference will be had to Figs. 4 and 5. As shown the main registering mechanism is mounted on a carriage 1 and it consists of two sets of numeral wheels 7 and 8 of different constructions. The numeral wheels 7 which are located at the right hand side of the carriage are provided with a shoulder 10 and they are loosely located on a shaft 9 having pins 9' secured thereto. By rotating the shaft 9 by means of a thumb piece 11 the numeral wheels can be reset as is known in the art. The numeral wheels 8 which are located at the left hand side of the machine and on an extension of the shaft 9 are not provided with this resetting device which consists of the shoulders 10 and pins 9', but they are reset by means of a secondary shaft 12 provided with resetting pins 12'. In the example shown the said secondary shaft is provided by the shaft 12 which carries the well known transmission wheels 13 by means of which the values set on the setting mechanism are transmitted to the registering mechanism. For the purpose of resetting the numeral wheels 8 the shaft 12 is rotated and by such rotation shifted laterally by means of a cam face 14, whereby the pins 12' are brought into position to engage abutments 15 provided on the transmission wheels 13. The latter are always in engagement with the numeral wheels 8, so that upon rotation of the secondary shaft 12 which is thereby shifted laterally all the numeral wheels 8 are reset. The secondary shaft 12 is likewise rotated by means of the thumb piece 11. For this purpose a spur gear 19 is secured to the shaft 9 which is in mesh with a similar spur gear 20 secured to the secondary shaft 12. At the left hand end the shaft 12 is formed with a cam face 14 by means of which it is shifted laterally when it is rotated. The sleeve 16 on which the cam face for shifting the shaft 9 is formed is provided with a disk 17 having a notch 17'. The latter is normally engaged by the hooked end of a lever 18 loosely mounted on the outer end of the shaft 12. Thereby the said sleeve is locked in position. For resetting the numeral wheels located at the right hand end of the shaft 9 the lever 18 is thrown into engagement with the notched disk 17 so as to lock the sleeve 16 and its cam face in position. If now the thumb piece 11 is rotated it rides on the cam face 16, so that the shaft 9 is shifted toward the right and the pins 9' are moved into position for engagement with the abutments 10. Therefore, upon further rotation of the thumb piece 11 the numeral wheels at the right hand side of the shaft 9 are reset. By shifting the shaft toward the right the spur gear 19 is thrown out of engagement with the gear 20. Therefore the shaft 12 remains stationary, and the numeral wheels at the left hand end of the said shaft the resetting mechanism of which is controlled by the shaft 12 are not reset. If it is desired to reset the numeral wheels at the left hand side of the carriage the lever 18 is thrown out of engagement with the notched disk 17. Therefore, when rotating the thumb piece 11, the shaft 9 is rotated, but it is not shifted toward the right, because the released disk 17 takes part in the rotation of the said shaft. Therefore the gears 19 and 20 remain in engagement with each other and rotation is imparted to the shaft 12. The latter is shifted to the right by its cam face 14, so that the pins 12' come into position for engagement with the studs 15. Therefore the shaft 12 transmits resetting movement to the numeral wheels through the intermediary of the pins 12', the studs 15 and the transmission wheels 13.

If desired known means may be provided whereby the proper operation of the resetting shaft is assured in case the machine crank is not in proper position. Such means which consist of a notched disk 21, a gear wheel 22 secured thereto and mounted therewith on the shaft 12, and a gear wheel 23 in mesh with the gear wheel 22 and mounted on shaft 9 are known in the art. In the present case the gear wheel 22 connected with the disk 21 must be so broad, that it remains constantly in engagement with the driving gear 23.

In Figs. 6 and 7 I have shown an example in which all the numeral wheels of the main registering mechanism are provided with a resetting mechanism of known construction by means of which they are simultaneously reset, while the numeral wheels of the right hand group are provided with a second resetting mechanism controlled by a secondary shaft by means of which they are reset independently of the other group. The resetting devices can be arranged in this way, because the numeral wheels of the left hand group are reset only at the end of the calculating operation when the resetting of the numeral wheels of the right hand group is not objectionable. As shown in Figs. 6 and 7 all the numeral wheels 7 and 8 of the registering mechanism are provided with a resetting mechanism of known construction which comprises a resetting shaft 9 provided with pins 9', and studs 10 secured to the numeral wheels. The resetting shaft is rotated in the usual way by means of a thumb piece 11, and it is shifted toward the right by cam faces provided on the nut of the thumb piece and a coöperating sleeve 16. Besides a secondary resetting mechanism is provided which acts on the numeral wheels 7 of the right hand group. In the example shown the said secondary resetting mechanism consists of a secondary shaft 120 provided with pins 121 which are adapted to act on studs 150 provided on the transmission wheels 13. The sleeve 16 is formed with a flange 170 which is normally locked against rotation by a locking pin 181, so that rotation of the thumb piece causes a shifting of the shaft 9 toward the right. If however it is desired to reset only the numeral wheels of the right hand group, the locking pin 181 is pulled out of engagement with the flange 170 by means of a rocking key 24. If now the thumb piece 11 is rotated, the flange 170 is carried along, so that the shaft 9 is not shifted, and resetting by the main resetting mechanism is made impossible. To the sleeve 16 a gear wheel 190 is secured which is in mesh with a gear wheel 200 mounted on the shaft 12. Therefore the shaft 12 is rotated by the thumb piece, and at the beginning of its rotation it is shifted to the right by its cam face 14, so that its pins 121 come into position for engagement with the studs 150 in the same manner as has been described with reference to the example shown in Figs. 4 and 5.

I claim herein as my invention:

1. In a calculating machine, the combination with a registering mechanism comprising a plurality of registering elements, and means to transmit values on said registering mechanism, of means to reset some of the registering elements to zero position independently of other similar elements consisting of a secondary shaft having resetting means thereon.

2. In a calculating machine, the combination with a registering mechanism comprising a plurality of registering elements, and means to transmit values on different groups of said registering mechanism, of secondary means to reset some of the groups of registering elements independently of other groups of the same kind of elements.

3. In a calculating machine the combination with a setting mechanism adapted to have values set thereon, a registering mechanism, means to transmit the values set on said setting mechanism to the registering mechanism, and means to bring said setting mechanism into coöperation with different groups of registering elements of the registering mechanism, of secondary means to reset one of said groups to zero position independently of other groups.

4. In a calculating machine, the combination with a registering mechanism comprising a plurality of registering elements, and means to transmit values on said registering mechanism, of a secondary shaft, resetting means on said shaft adapted to coöperate with some of the registering elements with the exclusion of others, and means to coöperate with said secondary shaft for resetting the registering elements coöperating therewith.

5. In a calculating machine, the combination with a registering mechanism comprising a plurality of registering elements, transmission elements coöperating with said registering elements, and means to transmit values on said registering mechanism through the intermediary of said transmission elements, of resetting devices on a part of said transmission elements with the exclusion of the others, and means to operate said transmission elements for resetting the registering elements.

6. In a calculating machine, the combination with a registering mechanism comprising a plurality of registering elements, and means to transmit values on said registering mechanism, of main resetting mechanism, secondary resetting mechanism adapted to reset some of the registering elements with the exclusion of others, operating means connected with both resetting mechanisms, and means to make either one of said resetting mechanisms inoperative.

In testimony whereof I have hereunto set my hand in presence of two subscribing witnesses.

FRANZ TRINKS.

Witnesses:
 WILHELM LEHRKE,
 WILLI FAHN.